United States Patent [19]
Van Dijck et al.

[11] Patent Number: 4,624,879
[45] Date of Patent: Nov. 25, 1986

[54] RECOVERABLE ARTICLE

[75] Inventors: Francis Van Dijck, Kessel-Lo; Johan Peeters, Rillaar; Jozef Vanbeersel, Temse, all of Belgium

[73] Assignee: N.V. Raychem S.A., Kessel-lo, Belgium

[21] Appl. No.: 667,940

[22] Filed: Nov. 2, 1984

[30] Foreign Application Priority Data

Nov. 8, 1983 [GB] United Kingdom ............................ 8329753

[51] Int. Cl.⁴ ................................................. B32B 3/06
[52] U.S. Cl. .............................. 428/102; 174/DIG. 8; 285/381; 403/273; 428/36; 156/85
[58] Field of Search .................................. 428/102, 36; 174/DIG. 8; 285/381; 403/273; 156/85

[56] References Cited
U.S. PATENT DOCUMENTS

| | | | |
|---|---|---|---|
| 3,379,218 | 4/1968 | Conde | 138/99 |
| 3,455,336 | 7/1969 | Ellis | 138/156 |
| 3,495,629 | 2/1970 | Botsolas | |
| 3,975,039 | 8/1976 | Penneck et al. | |

FOREIGN PATENT DOCUMENTS

| | | |
|---|---|---|
| 045213 | 2/1982 | European Pat. Off. |
| 058054 | 8/1982 | European Pat. Off. |
| 1225463 | 3/1971 | United Kingdom |

*Primary Examiner*—John E. Kittle
*Assistant Examiner*—Thomas C. Saitta
*Attorney, Agent, or Firm*—Edith A. Rice; James G. Passé; Herbert G. Burkard

[57] ABSTRACT

This invention relates to a recoverable article for covering objects in which two or more cover pieces are joined together to form the article. The shape and recovery ratios of the cover pieces are chosen such that the amount of recovery does not differ by more than 20% on either side of the join line. This avoids wrinkling.

8 Claims, 7 Drawing Figures

RECOVERABLE ARTICLE

DESCRIPTION

This invention relates to recoverable articles for covering objects, for example covering pipes and pipe joints, or cables such as electrical cables.

A "recoverable" article is one whose dimensional configuration may be made to change when subjected to an appropriate treatment. Usually these articles recover towards an original shape from which they have previously been deformed but the term "recoverable", as used herein, also includes an article which adopts a new configuration, even if it has not been previously deformed. The article may be heat recoverable, such that its dimensional configuration may be made to change when subjected to heat treatment.

In their most common form, heat-recoverable articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

Heat recoverable articles are typically made from a polymer such as an olefinic polymer, for example polyethylene or ethylene copolymers with propylene butene, vinyl acetate or ethyl acetate; polyvinyl chloride or polyvinylidene fluoride; which has been cross-linked, for example by irradiation with high energy electrons or gamma-radiation or has been chemically cross-linked.

In the production of heat recoverable articles, the polymeric material may be cross-linked at any stage in the production of the article that will enhance the desired dimensional recoverability. One manner of producing a heat-recoverable article comprises shaping the polymeric material into the desired form, subsequently cross-linking the polymeric material, heating the article to a temperature above the crystalline melting point or, for amorphous materials the softening point, as the case may be, of the polymer, deforming the article and cooling the article whilst in the deformed state so that a deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

It is know to use recoverable articles to cover objects. U.S. Pat. No. 3,297,819 (to Wetmore), for example, discloses a heat-recoverable polymeric sleeve that can be used to cover a welded pipe joint for corrosion protection.

The pipe joint to be protected is a butt joint between two pipes, and the covering recoverable polymeric sleeve is a simple tubular shape that is convenient and inexpensive to manufacture. Where more complex shaped objects are to be covered by a recoverable article a more complex shaped recoverable article is required. In U.S. Pat. No. 3,455,336 (to Ellis), for example, there is disclosed a heat-recoverable sheet, two opposite edges of which have protuberances along their length which, when the sheet is wrapped around the object to be covered, are in abutting relationship and can be held in such relationship during and after recovery by a fastening means, for example a metal channel. By the use of suitable moulded recoverable parts, and using two or more sets of abutting protuberances and corresponding fastening means, the recoverable article can be used for covering T or Y junctions on existing pipes and cables. Such moulded recoverable parts are however relatively expensive.

It is one object of the present invention to provide a recoverable article that can be used, inter alia, to cover complex shapes, but which avoids the necessity of using complex, and expensive moulded recoverable articles.

A first aspect of the present invention provides a recoverable article for covering an object of any predetermined shape comprising a recoverable cover joined to at least one other cover along a non-linear join-line such that at effective complete recovery of the article the amount of recovery of each cover parallel to the join-line on either side thereof does not differ by more than 20%, preferably by not more than 10%, and especially preferably by not more than 5%.

The term "non-linear join line" means any join-line that that extends other than in a single straight-line, including for example a curved line and also a line comprising a first linear portion extending in one direction and a second linear portion extending from the first portion in a different direction. Preferably the join-line extends in three dimensions, that is it extends out of a single plane.

The recovery of each cover parallel to the join-line on either side thereof is measured in a direction tangential to the join-line at that point.

The term "at effective complete recovery" indicates the state of the joined covers at the stage when they have been recovered into conformity with the underlying object. Preferably the covers are arranged such that they have only partially recovered when they are urged into conformity with the underlying object. This arrangement advantageously enhances covering by ensuring that there is a residual unresolved recovery force urging the covers into conforming contact with the object. Thus the state of effective complete recovery will not, in general, coincide with the state of full unhindered recovery of the cover parts.

A second aspect of the present invention provides a recoverable article for covering an object of any predetermined shape comprising a recoverable cover joined to at least one other cover such that at least one of the covers has a component of recovery substantially parallel to the join-line, and such that at effective complete recovery of the article the amount of recovery of each cover parallel to the join-line on either side thereof does not differ by more than 20%, preferably by not more than 10%, especially preferably by not more than 5%. The join-line is preferably non-linear and preferably extends in three dimensions.

In the articles according to both the first and second aspects of the present invention the path of the join-line is such that, at effective complete recovery, the amount of recovery of each cover on either side of the join-line does not differ by more than 20% preferably by not more than 10%, especially preferably by not more than 5%. The limitation on the difference in the amount of recovery on either side of the line ensures that at effective complete recovery the covers remain in contact along the join-line. Thus any wrinkling in the join-line, that is buckling of one cover relative to the other cover (which would be caused if one cover recovered significantly less than the other cover at any point along the join-line) is avoided.

In the article according to the first aspect of the present invention a cover on one side or covers on both sides of the join-line may have a zero component of recovery parallel to the join-line. A zero component of recovery may be achieved by using a non-recoverable cover, that is a heat stable cover, or by using a unidirectional recoverable cover having a direction of recovery perpendicular to the join-line. Thus various combinations of covers having components of recovery parallel to the join-line of zero upwards can be conceived which satisfy the criterium that the difference in recovery of the covers on either side of the join-line is not be more than 20% preferably not more than 10%, especially preferably not more than 5%.

It is envisaged that recoverable articles according to the present invention can be used to cover any shape of object, including simple shapes such as a butt splice between two pipes. The articles are particularly useful for covering more complex-shaped parts, however, since a similarly complex-shaped recoverable article may be made up by joining two or more simpler shaped covers together, each of the covers being shaped so as to cover a portion of the underlying object. The advantage of using two or more simpler shaped covers rather than one single complex shaped article is that the simpler shaped parts will in general be easier to manufacture. The important discovery provided by the present invention is that it is possible to tailor complex shaped recoverable articles from smaller simpler recoverable parts carefully preselected in order to minimise the difference in recovery on either side of the join-line. It is essential to minimise the difference in recovery in this way. If this is not done, part of a cover on one side of a join-line may recover less than the part of the other cover directly opposite it one the other side of the join-line. This will cause the material of the least recovered cover to buckle at the join-line. This phenomenom is hereinafter referred to as wrinkling. Wrinkling is undesirable since it may result in the cover not conforming to the surface of the underlying object. This may, in turn, result in pockets of fluid, for example air, being trapped between the wrinkled cover and the substrate. For some applications, for example where the cover is to be used for corrosion protection, this may be particularly disadvantageous.

As stated above, the present invention is particularly advantageous since it enables complex shaped objects to be covered by combinations of covers which are simpler in shape than the object to be covered. According to the present invention the covers may be of any shape. Preferably, however, the component covers are of a simple shape that is simpler to manufacture than a corresponding single cover would be, designed to cover the same complex shaped object. In a particularly preferred embodiment at least one of the covers has a developable shape, that is a shape that can be unfolded into a substantially flat configuration. Examples of shapes that can be unfolded into substantially flat configurations include tubes of uniform cross-section, split tubes of uniform cross-section, and sheets. Tubes and sheets are particularly easy to manufacture, for example by extrusion. Where the developable shape is a sheet the sheet may be deformed into a non-flat configuration in which configuration it is joined to the other cover portion. In another preferred embodiment at least one of the covers is in the form of a tube which may vary in cross-section along its length. Tubes that vary in cross-section are relatively easy to manufacture, for example by extrusion, followed by preferential expansion of part of the length of the tube.

At least one, preferably each of the joined covers, is preferably tubular. Tubular covers may advantageously be used to cover generally elongate objects, for example pipes. The tubular covers may be of closed or of open cross-section. Where a tubular cover is of open cross section opposed edges of the cover are preferably arranged to meet and a closure is preferably provided to secure the opposed edges together. Such covers which will be referred to hereinafter as "wraparound" covers can be installed by wrapping the cover around the object to be covered and then installing the closure to hold the cover in place before recovery. Such covers may advantageously be used, for example, where a free end of the object to be covered is not available or where a branched object is to be covered.

A split tubular cover may be instrinsically in the shape of a split tube or be in the form of a flat sheet that has been folded into a split tube. Opposed edges of the split tube on either side of the split may be arranged either to abut or to overlap. In both cases a closure is preferably provided to secure the opposed edges of the split tube together. Any suitable closure may be used to close the wraparound. As an example, where the opposed edges overlap the closure may be, for example, in the form of an adhesive coated strip patch which is adhered to the overlapped edges. As another example, where the opposed edges abut, they may be provided with upstanding protuberances along their length, and a closure means in the form of a metal channel which slidingly engages the protuberances provided.

Recoverable articles according to the present invention may be used to cover branched objects. In one preferred embodiment the recoverable article is adapted to cover a pipe junction having at least three arms. A recoverable article similarly shaped to the underlying object, that is having at least three arms, may be made by joining together three covers each cover being selected to cover one of the arms. In order to install the recoverable article over the three-armed pipe-junction at least one of the covers must be of the wraparound type. In a particularly preferred embodiment the recoverable article is arranged to cover a T-shaped pipe junction. A suitable T-shaped recoverable article may be made by joining a tubular cover of closed cross-section to a wraparound cover, the tubular cover being arranged to cover the "stem" of the "T" and the wraparound cover to cover the "head" of the T or vice versa. If the free end of the pipe forming the stem of the T is not available the tubular cover covering this pipe may also be wraparound.

Recoverable articles according to the present invention are also particularly advantageous for covering non-branched objects which vary in cross-section along their length. For example it is frequently necessary to cover an object, for example an elongate object such as a pipe or pipe joint which has a maximum cross-sectional area that is significantly greater than its minumum cross-sectional area. Recoverable sleeves typically have a recovery ratio (ratio of pre-recovered/post-recovered diameter on free, unhindered recovery) of 2:1. It is also possible to manufacture sleeves having a recovery ratio as great as 4:1. Thus a single standard known recoverable sleeve of uniform cross-section can be used to cover any objects having a maximum/minimum cross-sectional area ratio that is less than 4:1. However where the ratio is greater than 4:1 it is not possible to use a single standard sleeve to cover the object. Furthermore where the ratio approaches 4:1 it is undesirable to use a single standard sleeve to cover the object since some parts of the sleeve will recover much more than other parts of the sleeve and this results in undesirable stresses in the recovered part. Recoverable articles according to the present invention provide a simple solution to covering such objects that vary in cross-section along their length; separate covers of appropriate cross-sectional area being selected for each part of the object of different cross-sectional area to be covered, and the separate covers then joined together. One embodiment according to the present invention provides a recoverable article comprising two or more joined tubular covers each of which is itself of generally constant cross-section, but wherein the ratio of the cross-section of a first cover to that of a second cover is at least 3:2, preferably at least 2:1, more preferably at least 3:1 especially preferably at least 4:1. The first cover may be joined directly to the second cover, or one or more transition covers may be joined between them. The transition cover or covers may be of uniform cross-section or may be generally tapered.

Recoverable articles according to the present invention may also advantageously be used to cover bends. In this case the join-line is preferably arranged to extend around the outside of the bend. Where a bend is to be covered, in particular a sharp bend, for example a right angled bend, there is an additional problem of wrinkling at the outside of the bend. Thus an extra correction factor must be introduced at the bend to eliminate the additional wrinkling. For cover pieces cut from unidirection recoverable material, the additional wrinkling may be eliminated, for example, by two methods. In the first method the cover pieces are cut such that the single direction of recovery is at an angle to the join line, and no alteration is made to the shape of the cover piece. In the second method, the cover piece is cut such that the single recovery direction is parallel to the join-line (as would be the case for a cover for a simple tubular substrate) and the shape of the part of cover that will cover outside of the bend is adjusted to eliminate the wrinkling. A combination of the two methods, i.e. adjusting both the shape and the angle between the recovery direction and the join-line may also be used.

Whatever the shape of the object to be covered, the recoverable article according to the present invention is preferably tailored, by appropriate choice of the shape of the components covers, such that the difference between the maximum and minimum amounts of effective complete recovery within any one of the covers is not more than 20%, preferaby not more than 15%, more preferably not more than 10% and especially preferably not more than 5%. This tailoring ensures that for each cover no part of that cover recovers a significantly greater amount than any other part of that cover.

Thus the present invention provides recoverable articles that can advantageously be used to cover complex shaped objects that it has hitherto only been possible to cover using recoverable moulded parts or using a non-recoverable solution for example tape wrapping or using a liquid, tar, or powder coating. Use of the recoverable articles of the present invention have a number of advantages compared to these prior art methods. For example, manufacture of the recoverable parts if much less expensive than manufacture of moulded parts which requires very expensive tooling. Also, installation of the recoverable articles is less craft sensitive than tape wrapping and it is quicker, simpler and less time consuming than the liquid tar or powder coating methods.

The recoverable cover and at least one other cover may be made from the same material or from different materials. The other cover may or may not be recoverable. The covers must however be compatible to the extent that they can be joined together.

Any recoverable material can be used for the recoverable cover. For example, any suitable cross-linked polymeric material having elastic memory imparted thereto may be used. As examples there may be mentioned polyolefins such as polyethylene or polypropylene or copolymers of these polymers with other ethylenically unsaturated monomers. Other polymers that are suitable include PVC, polyvinylidene fluoride, polytetrafluoroethylene and polyvinylidenefluoride/hexafluropropylene. The polymeric materials may also include filler additives to suit the intended use of the recoverable article e.g. semiconducting fillers or anti-tracking agents, flame retardants, plasticisers, pigments, stabilizers, and lubricants. As further examples of recoverable materials that can be used for the cover or covers there may be mentioned heat-recoverable fabrics. A number of heat-recoverable articles that are based on fabrics have recently been devised and are the subject of British Patent Application Publication Nos. 2135632, 2133740, 2135836, 2134334, and 2133639, the disclosures of which are incorporated herein by reference. Patent Application Publication No. 2133740, for example, describes and claims a dimensionally heat-recoverable fabric which comprises fibres that will recover when heated to a recovery temperature thereof, wherein the recoverable fibres have a tensile strength of at least 0.1 MPa at their recovery temperature and have been stretched to a extent that will cause the fabric to recover by at least 40% when heated to the recovery temperature of the recoverable fibres. Any of the fabric materials described in the above mentioned copending British Patent Applications is suitable for use as the recoverable cover of the present invention. In a preferred embodiment a 90/12 twill HDPE/glass yarn fabric coated with LDPE is used. It is particularly preferred to use a heat recoverable fabric where the cover is to be used to cover a joint, for example between two elongate substrates, since the fibres, in either the warp or the weft, may be aligned with the pull-out direction to give improved pull-out strength. The use of glass fibres to give improved pull-out strength is particularly preferred.

Where a fabric is used the crimp density and crimp direction of the fabric, relative to the join-line, and to the recovery direction is important. For simple tubular shaped covers preferably about 10 to 20% of crimp is introduced into the warp. For this crimp density the high degree of crimp is preferably arranged to extend at 90° to the direction of recovery and the direction of the join-line. For more complex shapes the crimp density and direction is more complex. In general to minimise the probability of failure on recovery the aim is to maximise the degree of crimp in the fabric and to arrange the crimp at 90° to the seam.

A laminate of different materials may also be used for one or each of the covers. For example a laminate of a suitable cross-linked polymeric material having plastic memory incorporated thereto, for example polyethylene, together with a heat recoverable fabric layer. Where such a laminate is used, the fabric layer is preferably arranged to be positioned on the inside when the cover is positioned on a substrate.

The recoverable cover is preferably heat-recoverable, that is to say it can be rendered recoverable by the application of heat. The cover may be heated by means of a propane torch or a hot air gun. The cover may instead, or in addition, be heated by an electrical heating system.

Systems for electrical heating of recoverable sleeves can be classified as two general types: firstly, an electrical heater can be secured in thermal contact with a recoverable sleeve, and secondly the materials of the sleeve may itself constitute part of the electrical circuit. In preferred embodiments of the present invention the recoverable cover is heat-recoverable and arranged to be heated by electrical heating systems of each of these two general types. Thus according to a first embodiment an electrical heater is secured in thermal contact with the recoverable cover, and in a second embodiment the material of the recoverable cover itself constitutes part of the electrical circuit.

In the first of these embodiments electrical heating wires or sheet may be bonded to or embedded in the sleeve so that the sleeve becomes hot simply through conduction. The recoverable cover may have branched tongue-like portions at its end, which can slot and bond together. The ends of the cover and the central part may be separately provided with electrical heating wires arranged in a zig-zag pattern, the wires terminating at the edge of the sheet for connection to a power source.

In the second embodiment the material of the cover itself constitutes part of the circuit itself has the ability to become hot when subjected to electrical power. The requirement here is for a material which is electrically resistive, is capable of being made heat-recoverable, and is flexible. Conductive polymers, such as those made by loading polyolefins with carbon black, have these characteristics. According to a preferred embodiment of the present invention the material of the recoverable cover comprises a conductive polymer. Conductive polymers can be made self-regulating by proper choice of the carbon content. Self-regulation results from the material having a positive temperature coefficient of resistance (PTC) so that when the material reaches a certain temperature its electrical resistance rises, thus sharply cutting off power input and preventing further heating. This feature is of great benefit since it allows simple power supplies without thermostats or other controls to be used and it makes installation of the sleeve less craft-sensitive. The heating characteristics may be improved by combining a layer of PTC material with a layer of constant wattage (CW) material in such a way that current flows through both: this can lead to reduced in-rush on initial connection of the power, and to a greater heating capacity. For a fuller discussion on electrically heatable polymers the reader is directed to U.S. Pat. No. 4,177,376, which although concerned mainly with heaters describes the electrical properties of the class of polymers commonly used to make recoverable sleeves.

Where the recoverable cover is arranged to be heated by an electrical heating means and is also foldable such that opposed edges meet and are secured together by a closure member, the heating means may, in a preferred embodiment be powered through the closure member. Such an arrangement is disclosed in copending British Pat. application No. 8305639, the disclosure of which is incorporated herein by reference.

A commercially available article embodying heat-recovery and conductive polymer self-heating is a tape marketed under the Raychem trade mark AUTO-WRAP. This tape is about 10 cm wide and has an electrical conductor running adjacent each longitudinal edge. It can be wrapped spirally around a substrate to be covered, and when powered through the two conductors it shrinks longitudinally thereby tightening onto the substrate. A recoverable article according to the present invention may be made by joining two covers of AUTOWRAP self-heating tape together.

The recoverable cover may be joined to the at least one other cover by any suitable method.

It is especially preferred to use a joining method that is carried out without heating. Such methods are especially preferred where the cover is heat-recoverable since it is desirable to use a joining method that can be carried out well below the recovery temperature of the cover so that the cover does not recover during the joining process. As examples of such methods that can be used there may be mentioned mechanical joining arrangements that penetrate the covers. Examples of such mechanical joining arrangements include stitching, stapling and riveting. These joining arrangements can be used alone or in any combination. Copending U.K. Patent Application Publication No. 2135632 describes the use of such a mechanical joining arrangement to join recoverable parts that comprise fabric material. The disclosure of this copending patent application is incorporated herein by reference.

Stitching is a preferred joining arrangement both for heat-recoverable cross-linked polymeric materials such as polyethylene and for heat recoverable fabrics. Where stitching is used the stitch density is important. A preferred density is about 10 stitches per inch. Where stitching is used for a fabric there is an upper preferred limit on the stitch density defined by the fabric, this limit being that it should be a great deal less than the warp density in order to reduce fibre damage to a minimum caused by inserting the stitching needle.

Although stitching may be used as a joining method for both heat-recoverable fabrics and heat-recoverable cross-linked polymeric sheet, under certain extremely unfavourable conditions, for example where the cover is subject to high fluid pressure (for example where the cover is used around a district heating pipe, wherein insulating foam is introduced between the inner pipe and the cover after the joint has been formed). It is preferred to use stitched heat-recoverable polymeric sheet than stitched fabric. It is believed that this is because the hole produced by the passage of the stitching needle closes up faster and to a greater extent in the sheet than in the fabric due to hydrostatic forces in the sheet.

Where mechanical joining means that puncture holes in the sheet are used, for example stitching, stapling or riveting it is preferred to include a flap preferably made from recoverable material, to cover the puncture holes.

The flap is preferably in the form of a strip, for example it may comprise a strip of polyethylene, that is positioned along the join-line after joining, to cover the punctured holes. The strip is preferably coated on at least one, preferably both, sides with adhesive, preferably a hot melt adhesive. The flap is preferably positioned to cover the holes so that it lies inside the article, that is between the article and the covered substrate. The double sided adhesive coating enables the flap to adhere to the cover and to the underlying substrate.

Another method that can be used to join the cover to at the at least one other cover is adhesive bonding. Where the cover is heat-recoverable the adhesive is preferably selected such that it bonds at a temperature well below the recovery temperature, and such that after bonding it is capable of withstanding the recovery temperature. This selection ensures that the adhesive maintains the bond during and after recovery.

Where a heat recoverable cover is used the joining method is preferably effected at a temperature at least 20° C., preferably 50° C., and especially preferably at least 100° C. below the recovery temperature of the cover, to ensure that recovery of the cover does not take place during the process.

A third aspect of the present invention provides a recoverable article for joining an object of any predetermined shape comprising a recoverable cover joined to at least one other cover by a joining arrangement that penetrates the covers, the article being arranged such that at effective complete recovery of the article the amount of recovery of each cover parallel to the join-line on either side thereof does not differ by more than 20%, preferably by not more than 10% and especially preferably by not more than 5%. Preferably the mechanical joining arrangement is stitching. As other examples, stapling or riveting may also be used or a combination of stapling and/or riveting and/or stitching.

In preferred embodiments according to the third aspect of the present invention each cover preferably has a zero component of recovery parallel to the join-line on either side thereof. Preferably the join-line is non-linear and preferably extends in three dimensions.

The recoverable article may be coated internally with an adhesive or other sealant. This may advantageously provide a seal between the covering article and the underlying object after recovery. A suitable adhesive or sealant may be chosen depending on the conditions to which the covered object is to be subjected. The adhesive or sealant may be coated on the article before or after the cover parts are joined together. In general the configuration of the covers will be simpler before joining than after joining. Hence in most cases it will be more convenient to coat the surfaces of the covers before joining.

The line on each cover along which that cover is joined to another cover may be positioned anywhere on the surface of the cover. The join-line is preferably spaced away from any edge of the cover. Especially preferably each cover is made in a shape such that the join-line extends generally parallel to and a small distance spaced from the edge of the cover. Preferably the join-line is spaced less than 30 mm, more preferably less than 20 mm, more preferably less than 10 mm and especially preferably less than 2 mm from the cover edge. Where one or more covers comprises a fabric the distance from the edge to the join line is preferably at least four weft insertions, more preferably, at least six, especially preferably at least ten. The joining of the covers may be effected such that the excess portions of the covers between the join-lines and the cover edges extend either internally or externally of the recovered article. Preferably the excess portions extend internally of the recovered article. Where the covers are coated internally with an adhesive or sealant this may advantageously provide a seal beteen the inwardly facing surface of one cover and the outwardly facing surface of an internally extending excess portion of the joined cover. It is preferred that the excess portions of the covers between the join-lines and the cover edges are small to minimise materials and also to minimise the size of the recovered article.

It is preferred that the recoverable article is provided with the cover parts already joined together along a permanent join-line. However the article may also be provided as an assembly of separate covers to be joined together in the field.

Where the recoverable article is of the wraparound type the article preferably comprises at least one join-line in addition to the closure line along with opposed edges of the wraparound article are joined.

The fourth aspect of the present invention provides a recoverable assembly for covering an object of any predetermined shape comprising a recoverable cover and at least one other cover the covers being joinable together along a non-linear join-line such that at effective complete recovery the amount of recovery of each cover parallel to the join-line on either side thereof does not differ by more than 20%, preferably by not more than 10% and especially preferably by not more than 5%.

A fifth aspect of the present invention provides a recoverable assembly for covering an object of any predetermined shape comprising a recoverable cover and at least one other cover that can be joined along a join-line such that at least one of the covers has a component of recovery substantially parallel to the join-line, the join-line following a path such that at effective complete recovery of the article the amount recovery of each cover parallel to the join-line on either side thereof does not differ by more than 20%, preferably by not more than 10, especially preferably by not more than 5%.

Where the covers in the assembly are wraparound covers the assembly preferably also comprises closures for the wraparound cover. The assembly also preferably comprises an arrangement for joining the covers.

In order to provide a recoverable article according to the present invention to cover an object of any given shape it is necessary to select two or more covers of appropriate shape and recovery that can be joined along a join-line such that at effective complete recovery the recovery of each part on either side of the join line does not differ by more than 20%, preferably by not more than 10%, especially preferably by not more than 5%.

A sixth aspect of the present invention provides a method of covering an object of any predetermined shape comprising: selecting at least two covers, at least one of which is recoverable; joining the covers along a join-line between them; and recovering the covers; the selection of the covers being such that at effective complete recovery of the joined covers the recovery of each cover on either side of the join-line does not differ by more than 20% preferably by not more than 10%, especially preferably by not more than 5%.

In order to cover an object of any given shape it may be possible to select different combinations of covers that can be joined together to provide an article that will cover the object. Thus, for example a first combination of joined covers joined along one set of the join-lines, or a second combination of different shaped covers joined along different join-lines may be used to cover the same shaped object.

Preferably the selection of covers is made such that the covers are a simple shape that is convenient and inexpensive to manufacture.

Articles according to the present invention may be used for a variety of applications. A particularly preferred application is for covering joints in district heating pipes, in particular T-joints in district heating pipes. District heating pipes comprise an inner, metal carrier pipe and a large diameter outer insulation jacket, and joints in district heating pipes are typically made by cutting back the insulation and welding the inner pipes. The welded area is then reinsulated by introducing foam around the weld. Thus when an article according to the present invention is used to cover district heating joints, a support casing, for example metal half shells, is preferably also included and positioned around the welded part. The support casing acts both to retain the foaming pressure and as an inner support onto which the article is recovered.

For a particular shape of article to be covered the position of the join-line is determined by the shape of the covers selected. The recovery ratios of the covers must then be selected such that the criterium that recovery on either side of the join-line does not differ by more than 20% preferably by not more than 10% especially preferably by not more than 5% is satisfied.

To cover an object of any given shape a recoverable article according to the present invention may be tailored by following the general sequential steps set out below.

1. First consider the shape of the object to be covered. The aim is to tailor the recoverable article so that is recovers to this shape at effective complete recovery.
   (a) Split this shape into two or more simpler shapes, that is shapes that are easy to manufacture (if this is particularly complex approximate the shape to a shape that can be split into a number of simpler shapes). These simpler shapes provide the shapes of the component covers of the article at effective complete recovery.
   (b) Preferably the simple shapes of the component covers described in (a) can be unfolded into a plane since such flat shapes are particularly easy to manufacture. Where the shapes are unfoldable, unfold them into a plane.
   (c) For each cover define mathematically the position of the edges of the cover and also the position of the join-line. The mathematical description may be, for example, by means of a parameter equation in terms of algerbraic unknowns. The lengths of the join-lines on each cover are equal.

2. Secondly consider the shape of the article and component covers before recovery.
   (a) Since the covers are joined together to provide the recoverable article, the length of the join lines on each cover are equal.
   (b) Each recoverable cover can be described by the equations of 1(c) taking into account an additional set of parameters that define the amount of recovery of each cover. Different sets of parameters can be found that satisfy the criterium 2(a); that the lengths of the join-lines on the component covers, before recovery, are equal.
   (c) The shape of the covers before recovery depends inter alia on how loosely the recoverable article is to surround the object before recovery.
   (d) It is generally desired that after recovery there is some unresolved recovery in the cover. The actual recovery ratios of the covers are selected accordingly.

3. Finally consider the criteria necessary to avoid wrinkling at the join-line.
   (a) In order to avoid wrinkling it is necessary to ensure that at each point along the join-line the recovery of each cover parallel to and on either side of the line does not differ by more than 20%, preferably by no more than 10%, especially preferably not more than 5%.
   (b) Using, for example, finite element mathematics deduce equations to calculate the differences in recovery of each cover parallel to and on either side of the join-line.
   (c) From the different sets of parameters that define the amount of recovery of the cover pieces given by 2b, deduce the optimum set of parameters which will minimise wrinkling at the join-line by using the equations of 3b.
   (d) The optimium recovery values given by 3c denote the actual amounts of recovery that take place in each cover when the recoverable shape of 2 transforms to the recovered shape of 3.

The mathematical calculations to determine the shapes and recoveries of the component cover pieces are preferably solved using a computer.

Advantageously a sequence of logic steps can be constructed such that given the shape and size of the substrates to be covered and the recovery ratio of the covers which it is desired to use, the computer will produce a graphic plot of the shape of the covers that must be used, or a printout of the coordinates of that shape. The logic sequence is preferably also arranged such that, if for the given recovery ratios of the covers no possible shapes will satisfy the nonwrinkling condition, the computer will indicate whether a cover of lower of higher recovery ratio should be used.

By way of example only and with reference to the accompanying drawings a specific example is now given to describe how the shape and recovery of two cover parts to joined together to form a T-shaped recoverable article are given.

This example is made with reference to FIGS. 1 to 7 wherein.

The sequential steps to be followed in the mathematical calculation are numbered to correspond to the general instructions given above.

(1) Consider first the shape of the article to be covered. this corresponds to the shape of the article according to the present invention at effective complete recovery.

Figure 1:
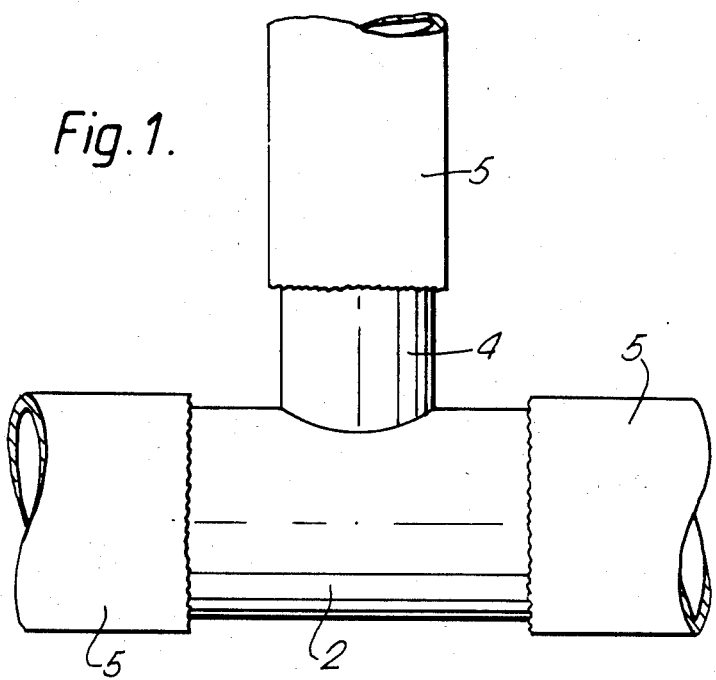
FIG. 1 shows a T-shaped junction between two pipes that are protected against corrosion by polymeric sleeving. The pipes are bare of sleeving at the junction and this bare region is to be covered by the article according to present invention.

(1a) A T-shaped pipe-junction comprises a main pipe 2 of outer diameter 219 mm and a branch pipe 4 of outer diameter 159 mm (FIG. 1). The pipes are covered by polymeric sleeving 5 for corrosions protection. The pipes are bare of polymeric sleeving 5 at the junction.

This is a typical configuration, for example, where pipes are to be welded together. The covers must be selected to extend a sufficient length along the main and branch pipes 4,6 to overlap the existing polymeric sleeving 5 on the pipes 4,6. For this example the length the recovered cover must extend along the main pipe 2 is 450 mm, and along the branch pipe 4 is 250 mm.

Figure 2:
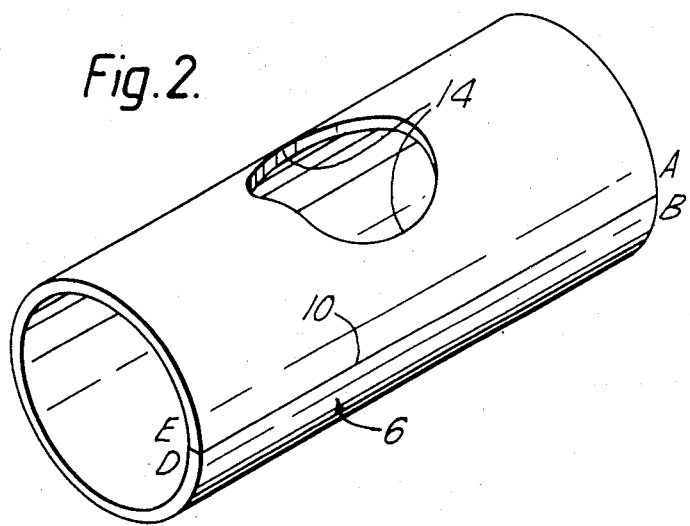
FIGS. 2 and 3 shows the shape of the recovered articles needed to cover the T-shaped junction, split into two simpler separate covers.
Figure 3:
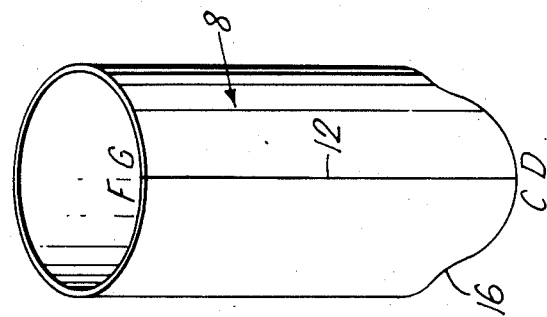

A T-shaped article representing the shape of the article according to the invention at effective complete recovery and corresponding to the shape of the T-shaped junction to be covered is split into two simpler separate cylindrical wraparound covers 6 and 8 (FIGS. 2 and 3) for covering pipes 2 and 4 respectively. Wraparound cover 6 is closed along closure-line 10 and cover 8 along line 12. Any type of closure (not shown) may be used. Cover 6 is to be joined at line 14 which is in the form of a loop to line 16 of cover 8.

Figure 4:
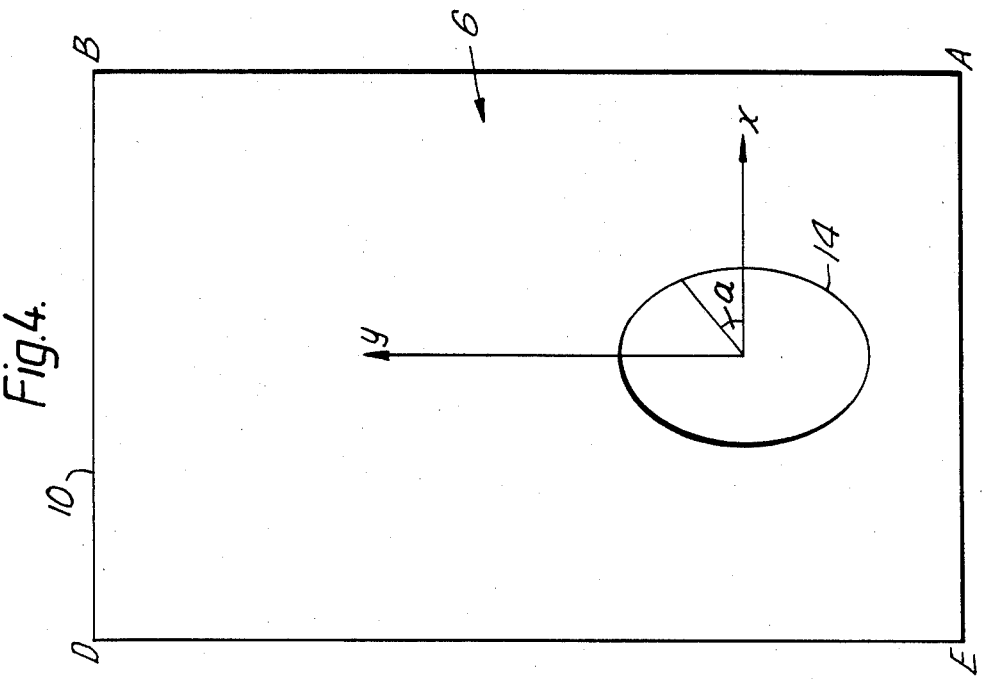
FIGS. 4 and 5 show the unfolded shapes of the recoverable parts necessary to provide the recovered parts of FIGS. 2 to 5.
Figure 5:
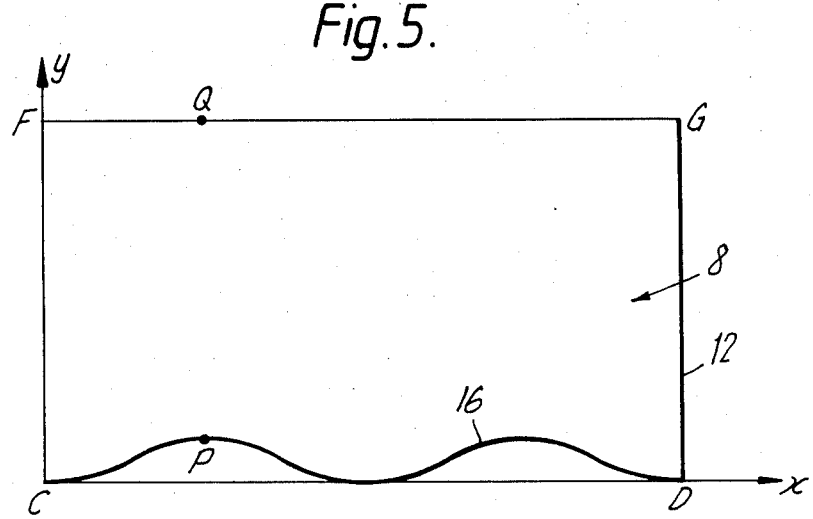
Figure 7:
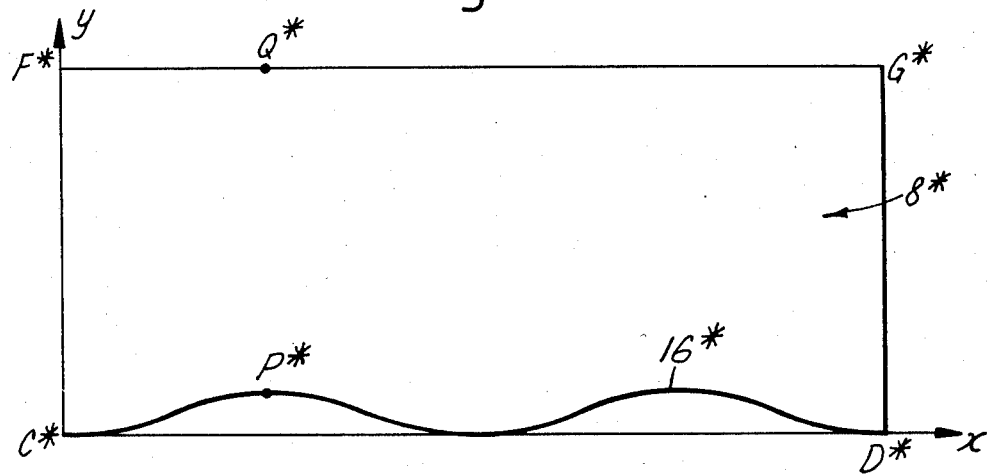
FIGS. 6 and 7 show the unfolded shapes of the recoverable parts necessary to provide the recovered parts of FIGS. 2 to 5.
Figure 6:
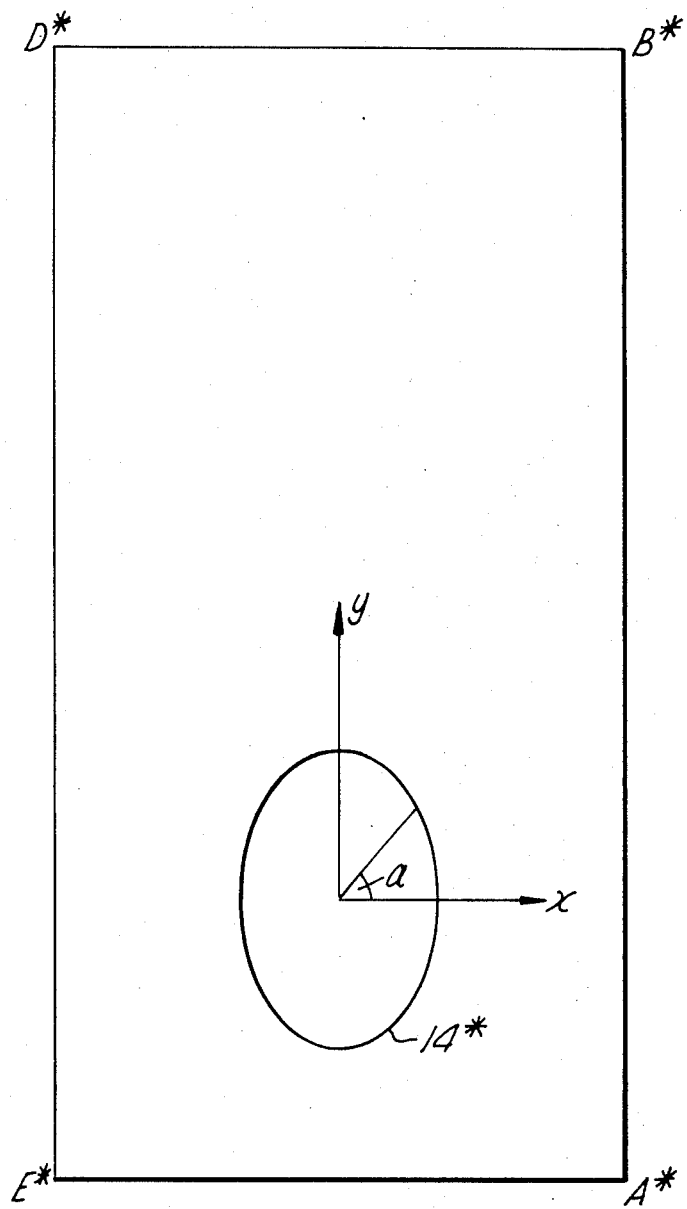

(1b) Covers 6 and 8 are unfolded into a plane (FIGS. 4 and 5). When unfolded, cover 6 has a rectangular outer perimeter ABDE, and Part 8 has an outer perimeter which is bounded by three straight sides FC, FG and GD and by a curved line representing the join-line 16.

Part 6 can be fully described as follows:

$$AB = DE = pi \times 219 \text{ mm (outer diameter of main pipe 2)}$$
$$= 688 \text{ mm}$$

AE=BD=450 mm (=width of the surface to be covered on main pipe 2)

The closure line 10 is provided such that the distance from EA to X-axis is $\frac{1}{4} \times 219$ mm ($\frac{1}{4}$ of the outer parameter of the main pipe).

The parameter equation of the joining line 14 which is in the form of a closed loop may be described in x and y coordinates as follows:

$$x = f_1(a)$$

$$y = f_2(a)$$

Where $f_1$ and $f_2$ are functions in terms of angle a which takes all values from 0 to 2pi (a is the angle described by a line extending from the looped join line 14 to a point within the looped join-line 14).

Part 8 can be fully described as follows:

$$FG = pi \times 159 \text{ mm (outer diameter of branch-off pipe 4)}$$
$$= 499.5 \text{ mm}$$

PQ=250 mm (Length of the surface to be covered on branch-off pipe 4)

The parameter equation of the curved joining line 16 (CD) may be described in x and y coordinates as follows:

$$x = f_3(b)$$

$$y = f_4(b)$$

Where $f_3$ and $f_4$ are functions in terms of angle b which takes all values from 0 to 2pi (b is the angle described by a line extending from joining line 16 to a point within the joining-line 16 when cover 8 is in its wrapped cylindrical configuration. 2. Considering the shape of the article before recovery. In order to determine the recoverable shape, consider the recovered shape expanded to render the article recoverable.

For cover 6 and cover 8 a heat-shrinkable sheet material is used with $$X_{T6} = Y_{T8} = 1$$

$$Y_{T6} = X_{T8} = 1.43$$

$X_{T6}$ and $Y_{T6}$ are the true expansion ratios in the length and the width of the cover 6, and similarly for part 8. They are defined as:

$$X_{T6} = Y_{T6} = \frac{LE}{LR}, \quad Y_1 = X_{T2} = \frac{WE}{WR}$$

Where:
LE=expanded length, WE=expanded width,
LR=recovered length, WR=recovered width (WE and WR are after FREE recovery)

$Y_{R6}$ is the part of expansion ratio $Y_{T6}$, used to make part 6 shrink on the main pipe 2, that is $Y_{R6}$ corresponds to the actual amount of recovery that takes place. It is desired that there is some unresolved recovery. Thus $Y_{R6} < Y_{T6}$. In this case $Y_{R6} = 1.30$ So the expanded version of cover part 6 can be described as follows wherein asterisked superscripts are used to describe the expanded recoverable lengths and lines:

$$AB^{} = DE^{} = Y_{R6}(AB) = Y_{R6}(DE)$$
$$= 1.3 \times 688 = 894 \text{ mm}$$

$$AE^{} = BD^{} = X_{R6}AE = X_{R6}BD$$
$$= 450 \text{ mm} (X_{R6} = 1)$$

The parameter equation of the join line 16* can be defined in terms of x and y coordinaes.
as $$x = X_{R6} f_1^*(a)$$

and $$y = X_{R6} f_2(a) = f_2^*(a) = f_2(a)$$

To find the expanded version of part 8, we have the condition that the joining lines 14 and 16 on both parts are equal. This can be satisfied mathematically by integration (not shown).
given that:

$$f_3(b) = X_{R8} f_3(b)$$

and $$F_4(b) = Y_{R8} f_4(b)$$

Several sets of values of $X_{R8}$ and $Y_{R8}$ can be found that satisfy the above mentioned condition that the joining lines 14 and 16 on both covers 6 and 8 are equal.

3. Minimal Wrinkling Condition

In general from the set of values of $X_{R8}$ and $Y_{R8}$ given above a mathematical method, for example a finite element method, may be used to select values of $X_{R8}$ and $Y_{R8}$ that minimise the difference in recovery parallel to the joining line on either side thereof.

In the present case $Y_{R8}$ is selected as 1 (i.e. cover 8 is expanded in one direction only).

A mathematical method, for example a finite element method can be used to determine the position along the join-line at which the difference in recovery on either side of the line is a maximum, and also to check that at this point the difference in recovery is less than 20%, preferably less than 10%, and especially preferably less than 5%, and thus satisfies the present invention.

For covering a bend similar considerations apply, two cover pieces being cut out and joined along the outside of the bend. As mentioned above to eliminate the extra wrinkling experienced at the outside of the bend either the shape or the angle between the recovery direction and the join-line, or both, must be adjusted. As for the T-piece, the shapes of the cover pieces are preferably calculated by computer, which will either give a graphic plot of the shapes required or list the coordinates of the shape, including the correction shape factor for the bend, and/or the angle between the recovery direction and the join-line at which the cover must be cut.

We claim:

1. A recoverable article for covering an object of any predetermined shape comprising a recoverable cover joined to at least one other cover along a non-linear join-line, by a mechanical joining arrangement that penetrates the cover, such that at least one of the covers has a component of recovery substantially parallel to the join-line and such that at effective complete recovery of the article, the difference between the percentage recovery of each cover on either side of the join-line, measured parallel to the join-line, is not more than 20%.

2. An article according to claim 1, wherein the join-line is non-linear and extends in 3 dimensions.

3. An article according to claim 1, wherein at least one cover is unfoldable into a substantially flat configuration.

4. An article according to claim 1, wherein the recoverable cover comprises a heat recoverable fabric.

5. An article according to claim 1, wherein the cover is joined to at least one other cover by a mechanical joining arrangement comprising on or more of stitching, stapling or riveting.

6. An article according to claim 1, wherein the percentage recovery difference is not more than 10%.

7. An article according to claim 6, wherein the percentage recovery difference is not more than 5%.

8. A method of covering an object of any predetermined shape comprising:
    (a) selecting at least two covers, at least one of which is recoverable;
    (b) joining the covers along a non-linear join-line, by a mechanical joining arrangement that penetrates the covers, such that at least one of the covers has a component of recovery substantially parallel to the join-line;
    (c) recovering the covers;
   the selecting of the covers being such that at effective complete recovery the difference between the percentage recovery of each cover on either side of the join-line, measured parallel to the join line, is not more than 20%.

* * * * *